(12) United States Patent
Lee et al.

(10) Patent No.: US 8,930,973 B2
(45) Date of Patent: Jan. 6, 2015

(54) OPTICAL DISC DRIVE HAVING PICKUP INTEGRATED WITH DISC INSERTION TRAY

(75) Inventors: Hyun-woo Lee, Suwon-si (KR); Hag-Ryeol Kim, Yongin-si (KR); Sang-hun Kim, Suwon-si (KR); Min Song, Hwaseong-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/295,769

(22) Filed: Nov. 14, 2011

(65) Prior Publication Data

US 2012/0174128 A1   Jul. 5, 2012

(30) Foreign Application Priority Data

Dec. 31, 2010   (KR) .................. 10-2010-0140684

(51) Int. Cl.
*G11B 17/056* (2006.01)
*G11B 33/12* (2006.01)

(52) U.S. Cl.
CPC ............ *G11B 17/056* (2013.01); *G11B 33/122* (2013.01)
USPC ............................ 720/652; 720/601; 720/677

(58) Field of Classification Search
CPC ............... G11B 17/04; G11B 17/0401; G11B 17/0405; G11B 17/0407; G11B 17/05–17/0515; G11B 17/056; G11B 17/0565; G11B 33/12–33/124

USPC ................. 720/600, 601, 648–653, 671, 672, 720/676–680, 674, 675, 696–699

See application file for complete search history.

(56) References Cited

U.S. PATENT DOCUMENTS

| | | | |
|---|---|---|---|
| 7,363,638 B2 | 4/2008 | Peng | |
| 7,451,465 B2 * | 11/2008 | Hayashi et al. | 720/675 |
| 2004/0133904 A1 * | 7/2004 | Minase et al. | 720/652 |
| 2004/0205785 A1 * | 10/2004 | Takahashi et al. | 720/601 |
| 2005/0022220 A1 * | 1/2005 | Huang | 720/697 |
| 2006/0005212 A1 * | 1/2006 | Ichinose et al. | 720/600 |
| 2006/0123438 A1 * | 6/2006 | Toyama et al. | 720/674 |
| 2009/0055846 A1 | 2/2009 | Torigoshi | |

FOREIGN PATENT DOCUMENTS

| | | |
|---|---|---|
| KR | 10-2001-0056892 | 7/2001 |
| KR | 10-0772364 B1 | 11/2007 |
| KR | 10-0844534 B1 * | 7/2008 |

OTHER PUBLICATIONS

English translation of KR 10-0844534 B1.*
First Office Action dated May 25, 2012, in counterpart Korean Patent Application No. 10-2010-0140684.

* cited by examiner

*Primary Examiner* — Nathan Danielsen
(74) *Attorney, Agent, or Firm* — NSIP Law

(57) ABSTRACT

A disc drive including a tray, a housing configured to receive the tray, a pickup device installed on the tray, and a main circuit board installed on the tray and connected to the pickup device.

10 Claims, 7 Drawing Sheets

OPTICAL DISC DRIVE HAVING PICKUP INTEGRATED WITH DISC INSERTION TRAY

CROSS-REFERENCE TO RELATED PATENT APPLICATION

This application claims the benefit of Korean Patent Application No. 10-2010-0140684, filed on Dec. 31, 2010, in the Korean Intellectual Property Office, the entire disclosure of which is incorporated herein by reference for all purposes.

BACKGROUND

1. Field

The following description relates to optical disc drive apparatuses, and additionally, to an optical disc drive apparatus including an improved tray structure having a main circuit board.

2. Description of the Related Art

In general, a slim-type disc drive used in a notebook computer or the like has a configuration in which an pickup device is installed on a tray for receiving a storage medium (e.g., a disc, such as an optical disc), and a main printed circuit board (PCB) for controlling the pickup device is installed in a housing (or a body) for receiving the tray. Because of the importance for such disc drives to maintain compatibility with a typical notebook computer, the disc drive must satisfy a predetermined standard. Accordingly, the design specifications for such disc drives are restricted to those that comply with the standard. A typical disc drive has a pickup device installed on a tray such that the pickup device and the tray are separate structures. A main PCB is installed on the tray. The pickup device includes a metal base on which a guide shaft is installed, and a body that is installed on the guide shaft so as to reciprocate relative to the metal base. The pickup device is a complex single complete structure. The metal base is generally formed of a plate-shaped metal material. A spindle motor is installed on the tray as a part of a single complete structure that includes a rotator having built therein a permanent magnet and a base on which a rotation axis of the rotator is supported.

SUMMARY

In one general aspect, there is provided a disc drive. The disc drive includes a tray, a housing configured to receive the tray, a pickup device installed on the tray, and a main circuit board installed on the tray and connected to the pickup device.

The disc drive may include a guide shaft, on which the pickup device reciprocates, and which is installed on the tray.

The disc drive may include a moving device configured to reciprocate the pickup device that is installed on the tray.

The disc drive may include a connector that is configured to connect the disc drive to an external apparatus is installed in the housing. The connector may be electrically connected to the main circuit board installed on the tray.

The disc drive may include a connector that is configured to connect the disc drive to an external apparatus is installed in the housing. The connector may be electrically connected to the main circuit board installed on the tray.

The disc drive may include a spindle motor installed on the tray. The rotation axis of the spindle motor is fixed directly to the tray.

The disc drive may be included in an electronic device.

The electronic device may be one of a portable game console, a portable/personal multimedia player (PMP), a portable lap-top PC, a desktop PC, a high definition television (HDTV), an optical disc player, and an optical disc recorder.

In another aspect, there is provided a disc drive. The disc drive includes a tray, a housing comprising a base and a cover, which are configured to receive the tray, a pickup device installed on the tray, a main circuit board installed on the tray and connected to the pickup device, and a guide shaft, on which the pickup device reciprocates, that is installed on the tray.

The disc drive may include a spindle motor installed on the tray. The rotation axis of the spindle motor may be fixed directly to the tray.

The disc drive may include a connector disposed at one end of the housing, and a cable that is folded so as to be misaligned with itself and that is interposed between the main circuit board and the connector.

The disc drive may be included in an electronic device.

The electronic device may be one of a portable game console, a portable/personal multimedia player (PMP), a portable lap-top PC, a desktop PC, a high definition television (HDTV), an optical disc player, and an optical disc recorder.

In another aspect, there is provided a disc drive. The disc drive includes a tray, a housing comprising a base and a cover, which are configured to receive the tray, an pickup device installed on the tray, a main circuit board installed on the tray and connected to the pickup device, a connector installed on a base of the housing and electrically connected to the main circuit board, and a guide shaft, on which the pickup device reciprocates, that is installed on the tray.

The disc drive may include a cable that connects the main circuit board and the connector. The cable may be folded so as to be misaligned with itself and is interposed between the main circuit board and the connector.

The disc drive may include a spindle motor installed on the tray. The rotation axis of the spindle motor is fixed directly to the tray.

The disc drive may include a support post, which is configured to support the guide shaft, and which is integrated with the tray and protrudes therefrom.

The disc drive may be included in an electronic device.

The electronic device may be one of a portable game console, a portable/personal multimedia player (PMP), a portable lap-top PC, a desktop PC, a high definition television (HDTV), an optical disc player, and an optical disc recorder.

Other features and aspects may be apparent from the following detailed description, the drawings, and the claims.

Figure 1:
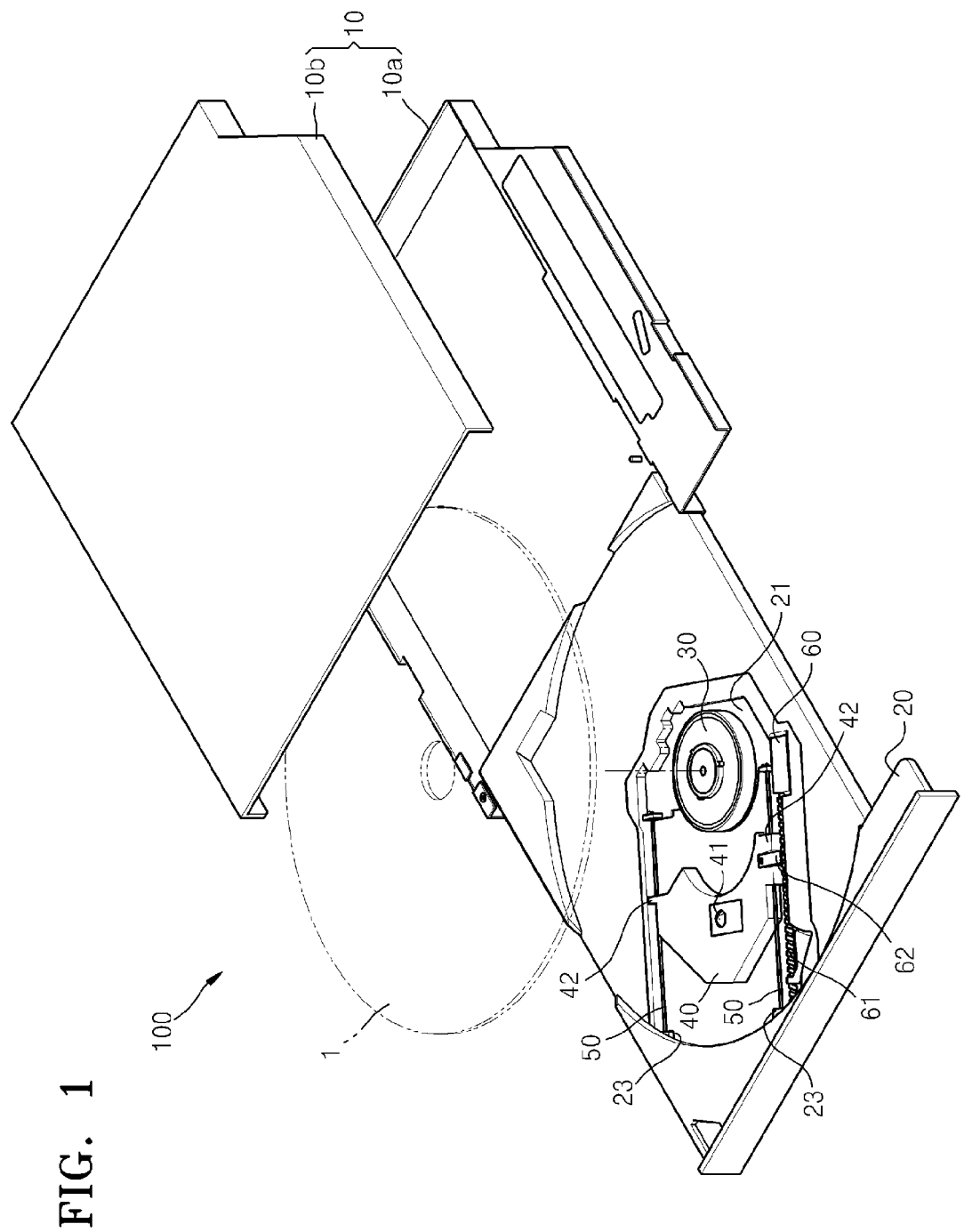
FIG. 1 is a drawing illustrating an example of a disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a drawing illustrating an example of a disc drive.

Referring to FIG. 1, a body of a tray 20 is coupled to a housing 10 which includes a base 10a and a cover 10b as a truck-type structure so as to allow the tray to slide into and out of the housing 10. A pickup device 40 and a spindle motor 30 are installed on the body of the tray 20. A storage medium 1 may be installed on the spindle motor. As an example, the storage medium 1 may be a disc, such as an optical disc or the like. The pickup device 40 is installed on two guide shafts 50 that are fixed in parallel to each other. The pickup device 40 device may be an optical pick up device. For example, the pickup device 40 may include an objective lens 41, an actuator (not shown) for driving the objective lens 41, and guiding portions 42 which are disposed at two sides of the objective lens 41 and which slide with respect to the shafts 50. The pickup device 40 includes a moving motor 60 that is a moving member configured to reciprocate the pickup device 40. The moving motor 60 may include a screw 61. The screw 61 is engaged with a screw coupling portion 62 that is coupled to the pickup device 40. The pickup device 40 reciprocates along the guide shafts 50, base on rotation of the screw 61. In other words, as the screw 61 rotates, the pickup device 50 travels along the guide shafts 50.

Figure 2:
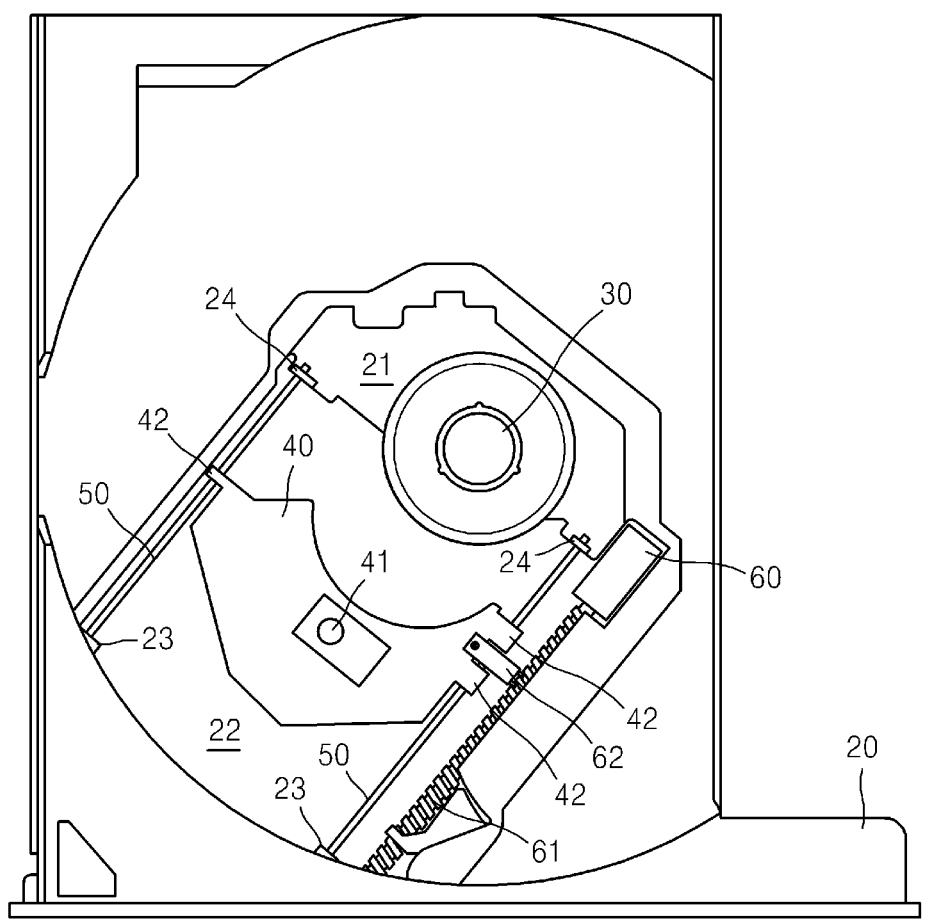
FIG. 2 is a drawing illustrating an example of a tray of a disc drive.

An example of the structure of a disc drive will be described in detail with reference to FIG. 2.

The tray 20 includes a space portion 22 in which the pickup device 40 is moveably installed and in which the pickup 20 reciprocates.

The guide shafts 50 are installed on two sides of the space portion 22. Each of the guide shafts 50 has a first end supported by supporting post 23 and a second end supported by supporting post 24. The support posts 2 and 24 are disposed on the tray. The first and second support posts 23 and 24 are operatively integrated with the tray 20. Two ends of the pickup device 40 are supported by the guide shafts 50 by guide portions 42. The screw coupling portion 62, which is engaged with the moving motor 60, may be disposed at one side of one end of the pickup device 40.

A motor base 21 which acts as a base of the spindle motor 30 is disposed at one side of the space portion 22 of the tray 20. The motor base 21 is integrated with the tray 20. As an example, the motor base 21 may be a portion of the tray 20.

Figure 3:
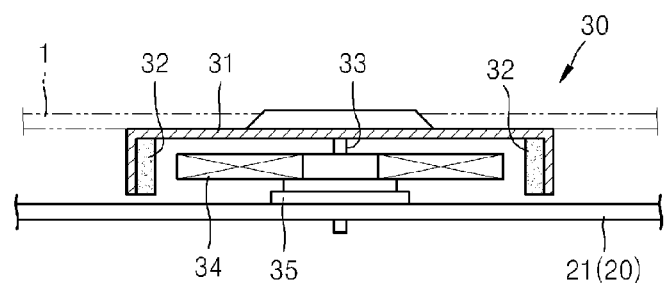
FIG. 3 is a drawing illustrating an example of a spindle motor that is installed directly on a tray in a disc drive.

FIG. 3 is a drawing illustrating an example of a spindle motor that is installed directly on a tray in a disc drive.

Referring to FIG. 3, an axis supporting portion 35, which includes a bearing (not shown), is fixed to the motor base 21. The axis supporting portion 35 is configured to support a rotation axis 33 of the spindle motor 30. A magnetic coil portion 34 may be fixed to an upper end of the axis supporting portion 35. The magnetic coil portion 34 is a stator. A rotator 31 is operatively coupled to the rotation axis. The rotator 31 has an upper surface on which the storage medium (not shown) is installed. The rotator 31 may also have permanent magnets 32 installed therein. Further, as an example, the spindle motor 30 may be installed on a portion of the tray 20 so as to have a complete structure of a motor.

For example, a structure of the disc drive as described with reference to FIG. 3 may be obtained by incorporating the motor base with a portion of the tray. In other words, such a structure is obtained by removing a separate motor base of a spindle motor as provided in a conventional disc drive structure and instead using a portion of a tray as a motor base.

Figure 4:
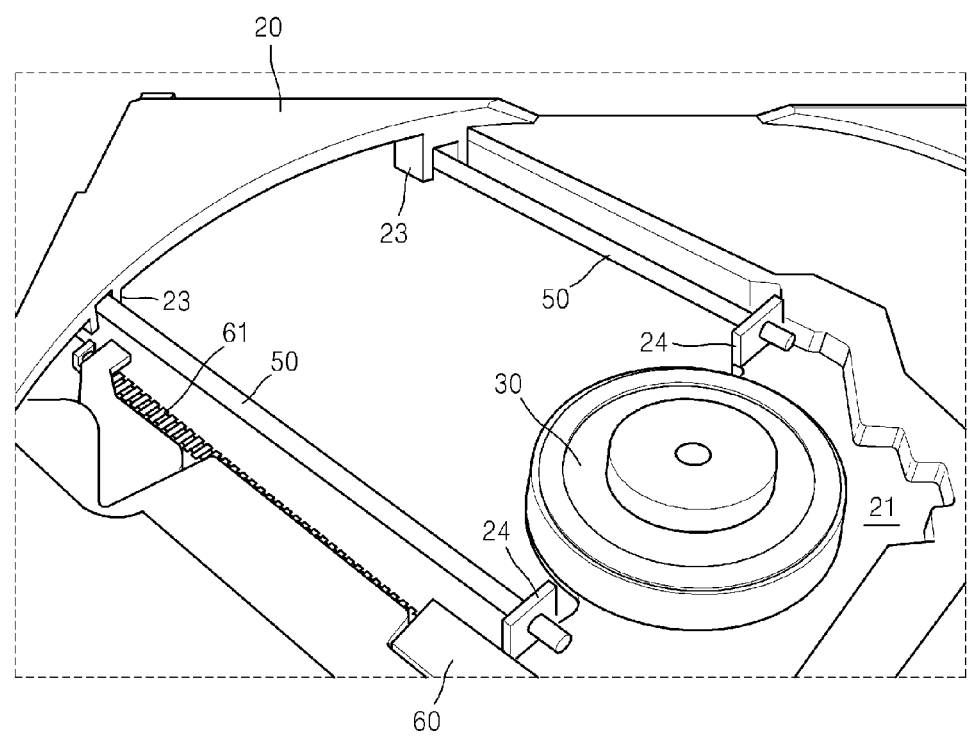
FIG. 4 is a drawing illustrating an example of guide shafts and support posts that support the guide shafts of a tray for a disc drive.

FIG. 4 is a drawing illustrating an example of a disc drive in which the first and second support posts 23 and 24 are configured to support the guide shafts 50.

Figure 5A:
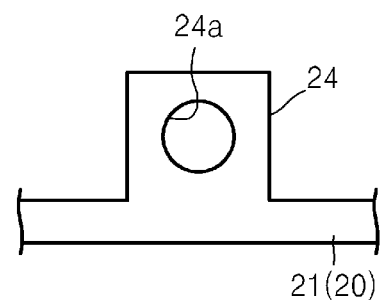
FIGS. 5A and 5B are drawings illustrating an example of portions of a supports post that support a guide shaft of a tray of a disc drive.
Figure 5B:
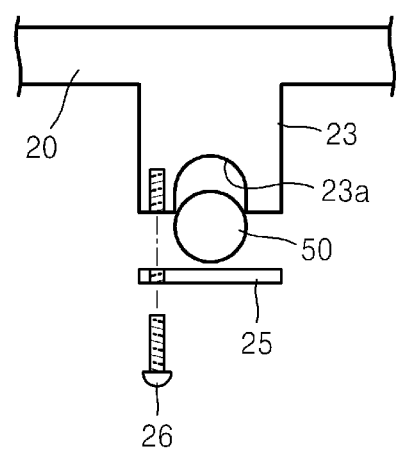

For example, as illustrated in FIG. 4, the first and second support posts 23 and 24, which are configured to support two ends of the guide shafts 50, are disposed on a bottom surface of one side of the tray 10 and at one side of the motor base 21, respectively. FIGS. 5A and 5B are drawings illustrating an example of portions of a support post that supports a guide shaft of a tray of a disc drive. As an example, the second support posts 24 may include through holes 24a into which ends of the guide shaft 50 are inserted. FIG. 5A illustrates an example of a through hole 24a in the second support post 24. The first support posts 23 may include saddle-shaped inserting grooves 23a into which the guide shafts 50 are inserted. The guide shaft 50 may be inserted from below the insertion grooves 23a. FIG. 5B illustrates an example of a saddle-shaped inserting groove 23a in the first support posts 23. In addition, as an example, the supporting post 23 may have an additional supporting member 25 operatively coupled thereto, such that the additional supporting member 25 prevents the guide shaft 50 from being inadvertently removed from the insertion recess 23a. For example, the additional supporting member 25 may be operatively coupled to the supporting post 23 by means of a screw 26.

Figure 6:
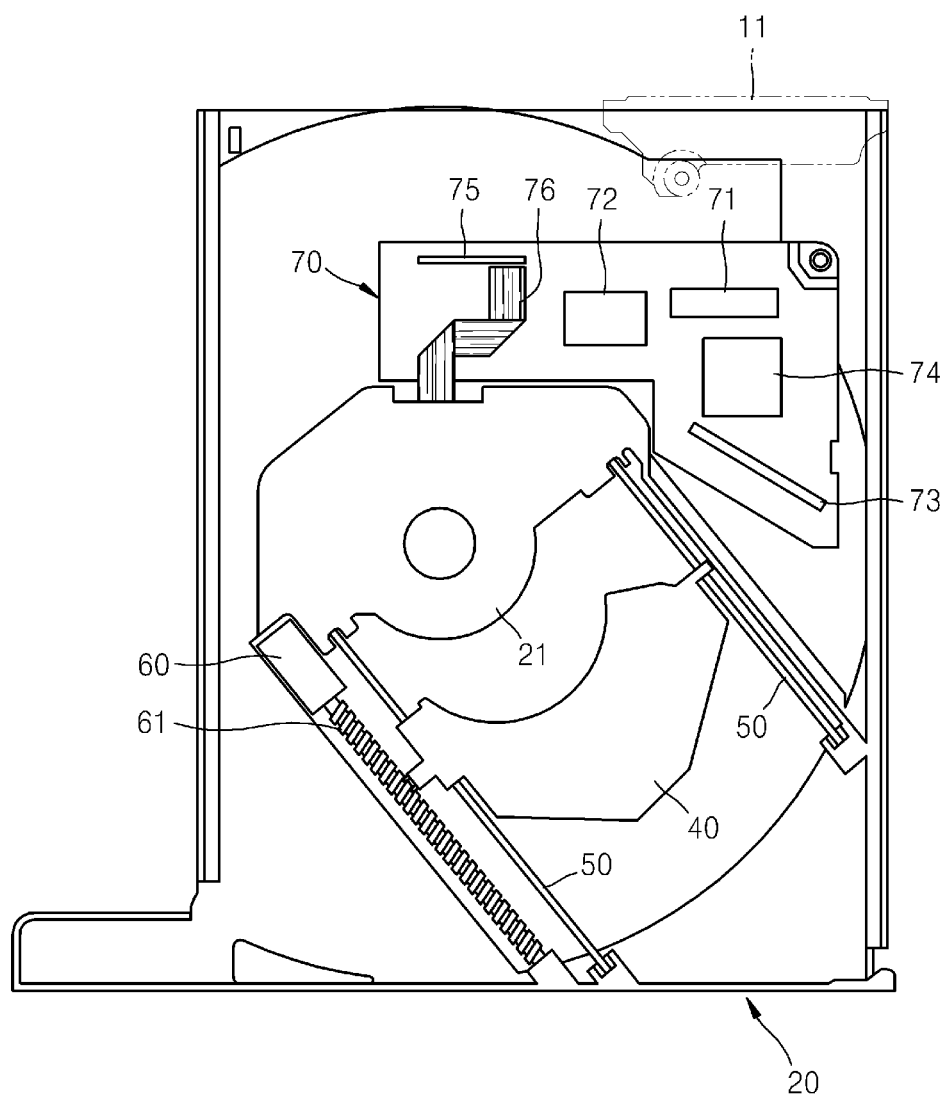
FIG. 6 is a drawing illustrating an example of a main printed circuit board (PCB) installed on a bottom surface of a disc drive.
Figure 7:
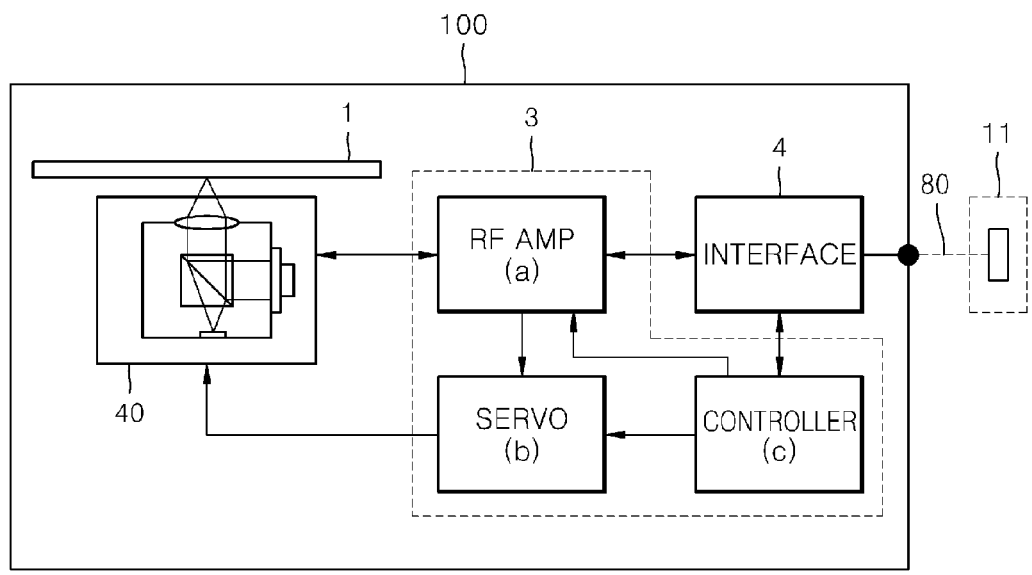
FIG. 7 is a drawing illustrating an example of a main PCB of a disc drive.

FIG. 6 is a drawing illustrating an example of the tray 20 of the disc drive. FIG. 7 is a drawing illustrating an example of a main PCB of a disc drive.

Referring to FIGS. 6 and 7, the disc drive may include a main printed circuit board (PCB) 70 which is disposed on a bottom surface of the tray 20. The main PCB 70 may be a front end system or component. The main PCB may include a radio frequency (RF) amplifier, a servo circuit, an interface, and the like. The main PCB may include an output interface connector 71, a connector 73, chipsets 72 and 74, and a connector 75 that is connected to the spindle motor 30. For example, the chipsets 72 and 74 may be microcontrollers or the like.

As an example of a front-end system 3, the front-end system 3 may include an RF amplifier (a) that is configured to amplify a signal from the pickup device 40, a servo unit (b) that is configured to control a tracking and focusing mechanism of the pickup device 40, and a system controller (c) that is configured to control the RF amplifier (a) and the servo unit (b). As an example, a current/voltage amplifier may be disposed at a front end of the RF amplifier (a) of the front-end system 3. The RF amplifier (a) may output, for example, raw-data (e.g., a signal) that is obtained by finally amplifying an RF signal. The RF amplifier (a) may output the signal to a master apparatus, for example, a portable computer through an interface 4.

As an example, if the main PCB is installed on the bottom surface of the tray 20, it is not necessary for housing 10 to include a conventional interface device. In other words, housing 10 may simply include a simple interface connector. As an example, the simple interface connector may include a serial advanced technology attachment (SATA) connector.

Figure 8:
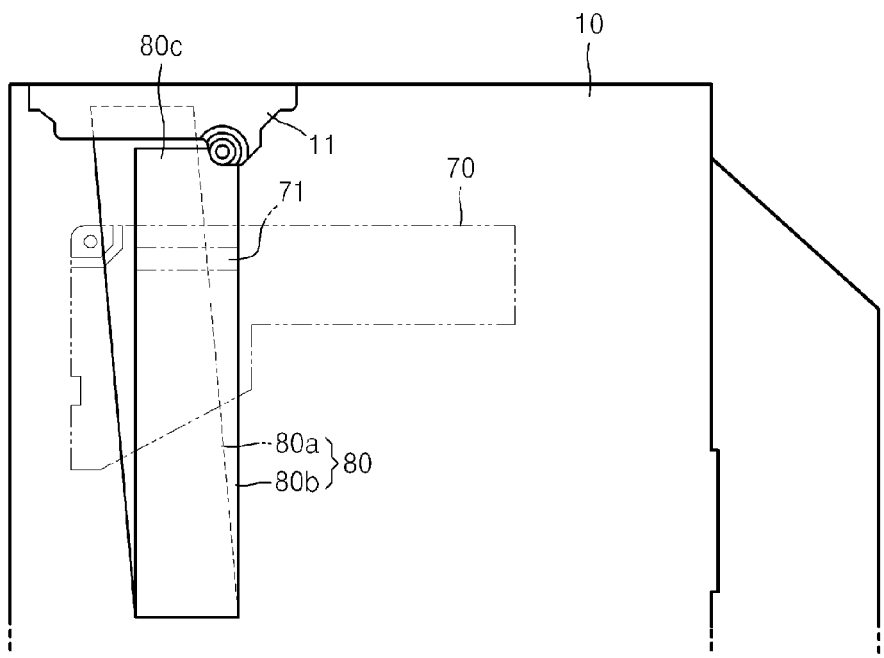
FIG. 8 is a drawing illustrating an example of an arrangement of a ribbon cable that is configured to output a signal, wherein the ribbon cable is formed on a housing base of a disc drive.

FIG. 8 is a drawing illustrating an output interface connector 11 operatively installed on a housing 10. For example, the output interface connector 11 may be installed at one side of a rear end of the housing 10. A ribbon cable 80, such as, for example, a flexible film cable (FFC), may be connected to the output interface connector 11 and a connector 71 disposed on the tray 20. The ribbon cable 80 includes a fixed portion 80*a* facing the housing 10, and a moveable portion 80*b* that is moveable in response to movement of the tray 20 The movable portion 80*b* of the ribbon cable may be positioned so as to overlap the fixed portion 80*a*. The connector 71 disposed on the tray 20 is coupled to a front end of the moveable portion 80*b*. The fixed portion 80*a* and the moveable portion 80*b* are disposed so as not to be in parallel with each other. For example, the movable portion 80*b* may be disposed relative to the fixed portion 80*a* such that the movable portion 80*b* and the fixed portion 80*a* make a V-shape. Accordingly, the same signal lines in the fixed portion 80*a* and the movable portion 80*b* may not overlap each other Thus, interference between the signals transmitted by the signal lines in the fixed portion 80*a* and the signals transmitted by the signal lines in the movable portion 80*b* that is caused by, for example, overlapping signal lines, is reduced. As an example, signal interference may be prevented by misaligning the fixed portion 80*a* and the moveable portion 80*b* with respect to each other. An abnormal distortion of the moveable portion 80*b* caused by movement of the tray 20 may be inhibited or otherwise prevented by arranging the moveable portion 80*b* in parallel with a direction along which the tray 20 moves.

Figure 9:
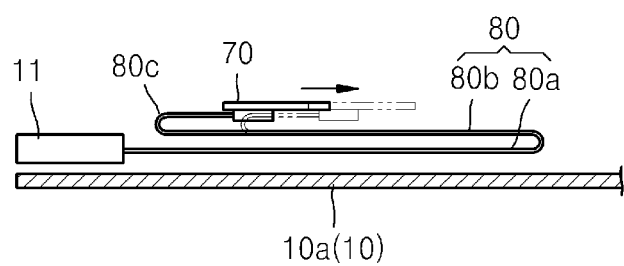
FIG. 9 is a drawing illustrating an example of a vertical arrangement of a ribbon cable.

FIG. 9 is a drawing illustrating an example of a state in which the ribbon cable 80 is folded.

As an example, the ribbon cable 80 may be folded. For example, two parts of the ribbon cable 80 may be folded over each other. A lowermost portion of the fixed portion 80*a* is fixed to the base 10*a* of the housing 10. An upper portion of the moveable portion 80*b* has a "U" shape that includes a bending portion 80*c*. As an example, the ribbon cable 80 may have a non-linear shape due to the fixed portion 80*a*, the movable portion 80*b*, and the bent portion 80*c*. In response to the main PCB 70 being moved as the tray 20 is moved, a position of the bending portion 80*c* may be varies relative to the moveable portion 80*b*.

Because a pickup device is installed directly on a tray itself, the number of components and processes required to manufacture such a disc device may be reduced. Accordingly, the manufacturing costs are thereby reduced. In particular, because the =pickup device may be installed on the tray without requiring a separate base, the inner space may be increased as much as a thickness of a conventional base.

Furthermore, in contrast to a conventional disc drive which a spindle motor that is installed as a separate component on the tray, an example of a disc drive according to one aspect includes a spindle motor installed directly on the tray, the number of components and processes required to manufacture such a disc device may be reduced. Accordingly, manufacturing costs are thereby reduced.

In addition, because a main PCB is installed on the tray, a distance between the pickup device and the main PCB may be reduced, thereby preventing a signal loss between the pickup device and the main PCB. For example the PCB may be fixed directly on the tray.

In some aspects, optical disc drives are provided in which the number of components and processes for manufacturing such are reduced. Accordingly, the manufacturing costs are thereby reduced.

Disk drives as described in the above examples may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a set top box, and the like capable of wireless communication or network communication consistent with that disclosed herein.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disc drive, the disc drive comprising:
a tray;
a housing configured to receive the tray;
a pickup device installed on the tray;
a spindle motor installed on the tray;
a main circuit board including a front-end system in the disc drive with a radio frequency amplifier and a servo circuit, the main circuit board installed on the tray and connected to the pickup device;
a connector installed in the housing that is directly connected to the main circuit board via a cable having a fixed portion facing the housing and a moveable portion that is moveable in response to movement of the tray, the connector configured to connect the disc drive to an external apparatus;
an exposed cable that directly connects the main circuit board installed on the tray to the spindle motor installed on the tray;
guide shafts installed on the tray and along which the pickup device reciprocates;
two support posts, which are integrally formed with the tray and project from opposite inner surfaces of the tray, configured to support a first of the guide shafts; and
two additional support posts, which are integrally formed with the tray and project from the opposite inner surfaces of the tray, configured to support a second of the guide shafts,
wherein the fixed portion and the moveable portion of the cable are disposed so as not to be in parallel with each other for reducing interference between the signals transmitted by the signal lines in the fixed portion and the signals transmitted by the signal lines in the moveable portion.

2. The disc drive of claim 1, wherein a moving device configured to reciprocate the pickup device is installed on the tray.

3. The disc drive of claim 1, wherein a rotation axis supporting portion of the spindle motor is fixed directly to the tray.

4. An electronic device, the electronic device comprising the disc drive of claim 1.

5. The electronic device of claim 4, wherein the electronic device is one of a portable game console, a portable/personal multimedia player (PMP), a portable lap-top PC, a desktop PC, a high definition television (HDTV), an optical disc player, and an optical disc recorder.

6. A disc drive comprising:
a tray;
a housing comprising a base and a cover, which are configured to receive the tray;
a pickup device installed on the tray;
a spindle motor installed on the tray;
a main circuit board including a front-end system in the disc drive with a radio frequency amplifier and a servo circuit, the main circuit board installed on the tray and connected to the pickup device;
a connector installed in the housing that is directly connected to the main circuit board via a cable having a fixed portion facing the housing and a moveable portion that is moveable in response to movement of the tray, the connector configured to connect the disc drive to an external apparatus;
an exposed cable that directly connects the main circuit board installed on the tray to the spindle motor installed on the tray;
guide shafts configured to be installed on the tray and along which the pickup device reciprocates;
two support posts, which are integrally formed with the tray and project from opposite inner surfaces of the tray, configured to support a first of the guide shafts; and
two additional support posts, which are integrally formed with the tray and project from the opposite inner surfaces of the tray, configured to support a second of the guide shafts,
wherein the fixed portion and the moveable portion of the cable are disposed so as not to be in parallel with each other for reducing interference between the signals transmitted by the signal lines in the fixed portion and the signals transmitted by the signal lines in the moveable portion.

7. The disc drive of claim 6, wherein the connector is disposed at one end of the housing.

8. The disc drive of claim 6, wherein a rotation axis supporting portion of the spindle motor is fixed directly to the tray.

9. An electronic device, the electronic device comprising the disc drive of claim 6.

10. The electronic device of claim 9, wherein the electronic device is one of a portable game console, a portable/personal multimedia player (PMP), a portable lap-top PC, a desktop PC, a high definition television (HDTV), an optical disc player, and an optical disc recorder.

* * * * *